US009442828B2

(12) United States Patent
Pilot et al.

(10) Patent No.: US 9,442,828 B2
(45) Date of Patent: *Sep. 13, 2016

(54) GENERATING TEST SCRIPTS THROUGH APPLICATION INTEGRATION

(71) Applicant: International Business Machines Corporation, Armonk, NY (US)

(72) Inventors: Richard W. Pilot, Winchester (GB); Graham Richards, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/338,708

(22) Filed: Jul. 23, 2014

(65) Prior Publication Data

US 2014/0337821 A1 Nov. 13, 2014

Related U.S. Application Data

(63) Continuation of application No. 14/254,137, filed on Apr. 16, 2014, now Pat. No. 9,317,406.

(30) Foreign Application Priority Data

Apr. 26, 2013 (GB) .................................. 1307567.6

(51) Int. Cl.
G06F 9/44 (2006.01)
G06F 11/36 (2006.01)

(52) U.S. Cl.
CPC ....... *G06F 11/3684* (2013.01); *G06F 11/3688* (2013.01); *G06F 11/3664* (2013.01)

(58) Field of Classification Search
None
See application file for complete search history.

(56) References Cited

U.S. PATENT DOCUMENTS

| 5,600,789 A * | 2/1997 | Parker ................ G06F 11/3688 714/38.11 |
| 5,983,001 A * | 11/1999 | Boughner .......... G06F 9/45512 714/38.1 |
| 8,239,826 B2 | 8/2012 | Elenburg et al. |
| 8,271,950 B2 | 9/2012 | Bharadwaj |
| 2005/0234708 A1 * | 10/2005 | Meehan .................. G06F 8/20 704/9 |
| 2005/0257198 A1 * | 11/2005 | Stienhans .......... G06F 11/3672 717/124 |
| 2007/0061625 A1 * | 3/2007 | Acosta ............... G06F 11/3688 714/38.1 |
| 2008/0010537 A1 | 1/2008 | Hayutin et al. |
| 2008/0155515 A1 * | 6/2008 | Stewart .............. G06F 11/3664 717/135 |
| 2009/0077422 A1 * | 3/2009 | Khaladkar .......... G06F 11/3684 714/33 |
| 2009/0089688 A1 * | 4/2009 | Zhao .................. G06F 11/3684 715/762 |
| 2009/0217303 A1 * | 8/2009 | Grechanik ............... G06F 8/38 719/320 |
| 2010/0229155 A1 * | 9/2010 | Adiyapatham ..... G06F 11/3672 717/124 |
| 2011/0202901 A1 | 8/2011 | Givoni et al. |
| 2011/0214107 A1 * | 9/2011 | Barmeir .............. G06F 11/3684 717/125 |
| 2012/0023485 A1 * | 1/2012 | Dubey ...................... G06F 8/30 717/125 |
| 2014/0165040 A1 * | 6/2014 | Augustin ............ G06F 11/3684 717/124 |
| 2014/0282407 A1 * | 9/2014 | Channamsetti et al. ...... 717/124 |

* cited by examiner

*Primary Examiner* — Isaac T Tecklu
(74) *Attorney, Agent, or Firm* — Davis J. Zwick; Gregory K. Goshorn; Greg Goshorn, P.C.

(57) ABSTRACT

This claimed subject matter relates to techniques for generating a test script from a pre-existing script for testing a graphical user interlace (GUI) comprising: parsing a pre-existing test script; parsing the model associated with the GUI; identifying GUI actions that that are identified by keywords and associated parameters that exist in the pre-existing test script; and generating a new test script by adding the identified actions.

8 Claims, 7 Drawing Sheets

GENERATING TEST SCRIPTS THROUGH APPLICATION INTEGRATION

CROSS-REFERENCES TO RELATED APPLICATIONS

The present application is a continuation and claims the benefit of the filing date of an application entitled, "Generating Test Scripts Through Application Integration" Ser. No. 14/254,137, filed. Apr. 16, 2014, assigned to the assignee of the present application, and herein incorporated by reference

FIELD OF DISCLOSURE

This claimed subject matter relates to techniques for generating test scripts through application integration. In particular, the claimed subject matter looks at parsing an existing test script for keywords to generate a new manual test script.

BACKGROUND

Graphical User Interface (GUI) testing is a predominantly manual process. Manual test scripts are used to guide new users through a user interface telling them what they should be able to see and do. For most companies, these test scripts were written many years ago and since then new techniques that automate the testing of user interfaces have been developed. It can be a lengthy and costly process for a company to convert existing test scripts over to an automated technique.

Testing tools that deal with automation or user interface tests often have a 'record' feature that will make a note of a user's actions and produce a test script that replicates their mouse clicks. These tools will not check the content of a window but just those links or buttons are in the same place and that they work. These tools may require manual recording each time instead of using the recorded script.

BRIEF SUMMARY OF THE INVENTION

In a first aspect of the claimed subject matter there is provided a technique for generating a test script from a pre-existing script for testing a graphical user interface (GUI), comprising a first parser for parsing a pre-existing test script; a second parser for parsing the model associated with the GUI; a matching engine for identifying GUI actions that are identified by keywords and associated parameters that exist in the pre-existing test script; and a generator for generating a new test script by adding the identified actions.

Once the GUI model is ready liar examination, the embodiment looks at the first line of the test script for any keywords that identify GUI elements in the GUI model. If an element is found, the element is examined; the test script line is checked for any associated actions that needs be taken; and the action is added to the automated script before the next line is examined. The manual test scripts maybe further parsed using a natural language parser to highlight keywords and associated parameters. For example, identifying the manual action of "Press Enter Button". Further, the pre-existing script may be manually generated. In addition, further identifying GUI actions that contain keywords and parameters that exist in the pre-existing script may be identified; the further identified actions added to a candidate list; and the further identified actions added to the new test script if they are determined from the candidate list as possible actions.

Alternately, or if no GUI element is found, the whole line of the test script may be analyzed and any of the words in the line that appear in or are associated with GUI elements added to a candidate list. The candidate list may be checked for any GUI elements that can be used and could have an action and, if a suitable one is found the candidate may be added to the automated test script. In addition, a further identified action may be flagged in the new test script. A further identified action may be flagged so that if the conversion process gets stuck it can back-track to the flag and use a different element from the list. Further, a new test script may be generated using an empty test script template.

If no matching GUI elements are found or none of the elements in the list are suitable, then the process may be halted so that a user can input the appropriate action that the script needs to take.

Suitably, after a generated test script is produced, any successful decisions from the candidate list or any input that the user was required to solve are added to a global set of 'keyword <~>element' pairs for future manual test script parsing so that the process is refined over time.

This means that the converted test scripts produced are based upon the product being tested, providing a more accurate automated test being generated. This approach also has the advantage that significant programming knowledge is not required to automate manual test scripts. This approach is also able to learn about widgets that have been identified in previous manual tests, aiding in the conversion of future scripts.

The embodiments have an effect that operates below the application level and at the machine level of the computer where the operation of scripts is defined. The embodiments have an effect that results in the computer being made to operate differently using the generated scripts rather than the pre-existing scripts. Since the pre-existing scripts are more robust and aligned with the application programming language of a specific GUI then there would be an improvement in the speed and reliability of the operation of a host computer.

In a second aspect of the claimed subject matter there is provided a method of generating a test script from a pre-existing script for testing a graphical user interface (GUI) comprising: parsing a pre-existing test script for a graphical user interface (GUI); parsing the model associated with the GUI; identifying GUI actions that are identified by keywords and associated parameters that exist in the pre-existing test script; and generating a new test script by adding the identified actions.

In a third aspect of the claimed subject matter there is provided a computer program product for generating a test script from a pre-existing script, the computer program product comprising a computer-readable storage medium having computer-readable program code embodied therewith and the computer-readable program code configured to perform all the actions of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

In a fourth aspect of the claimed subject matter there is provided a computer program stored on a computer readable medium and loadable into the internal memory of a digital computer, comprising software code portions, when said program is run on a computer, for performing all the actions of the method claims.

In a fifth aspect of the claimed subject matter there is provided a data carrier aspect of the preferred embodiment that comprises functional computer data structures to, when loaded into a computer system and operated upon thereby, enable said computer system to perform all the actions of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

The claimed subject matter will now be described, by way of example only, with reference to preferred embodiments, as illustrated in the following figures.

DETAILED DESCRIPTION

Figure 1:
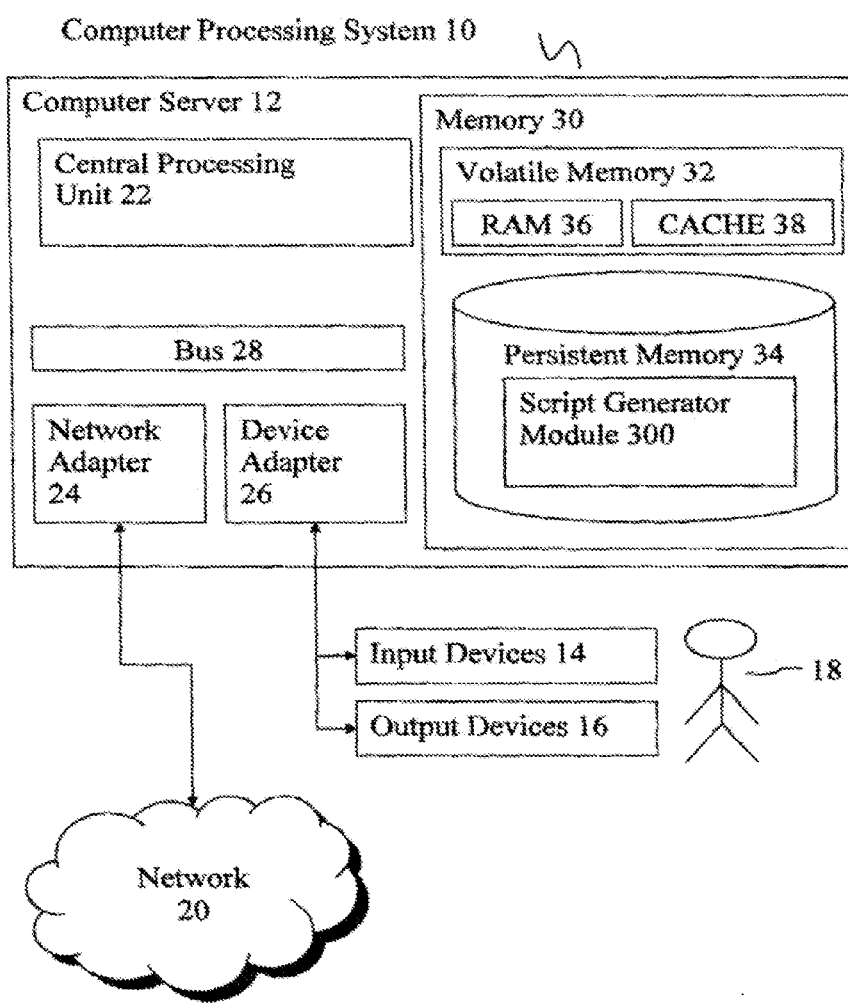
FIG. 1 is a deployment diagram, in accordance with a preferred embodiment of the claimed subject matter.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 may include one or more of: a keyboard, a scanner, a mouse, trackball or another pointing device. Output devices 16 may include one or more of a display or a printer. Computer processing system 10 communicates with network devices (not shown) over network 20. Network 20 can be, but is not limited to, a local area network (LAN), a wide area network (WAN), or the Internet.

Computer server 12 comprises: central processing unit (CPU) 22; network adapter 24, device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret, a high level language in terms of machine operations.

Network adapter 24 is connected to bus 28 and network 20 for enabling communication between the computer server 12 and network devices.

Bus 28 couples the main system components together including memory 30 to CPU 22. Bus 28 represents one or more of any of several types of bus structures, including but not limited to a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally, volatile memory is used because it is faster and generally non-volatile memory is used because it will hold the data for longer.

Computer processing system 19 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the claimed subject matter.

The set of program modules configured to carry out the functions of the preferred embodiment comprises a script generator module 300 (see FIG. 3) and further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID) tape drives, and data archival storage systems.

Figure 2:
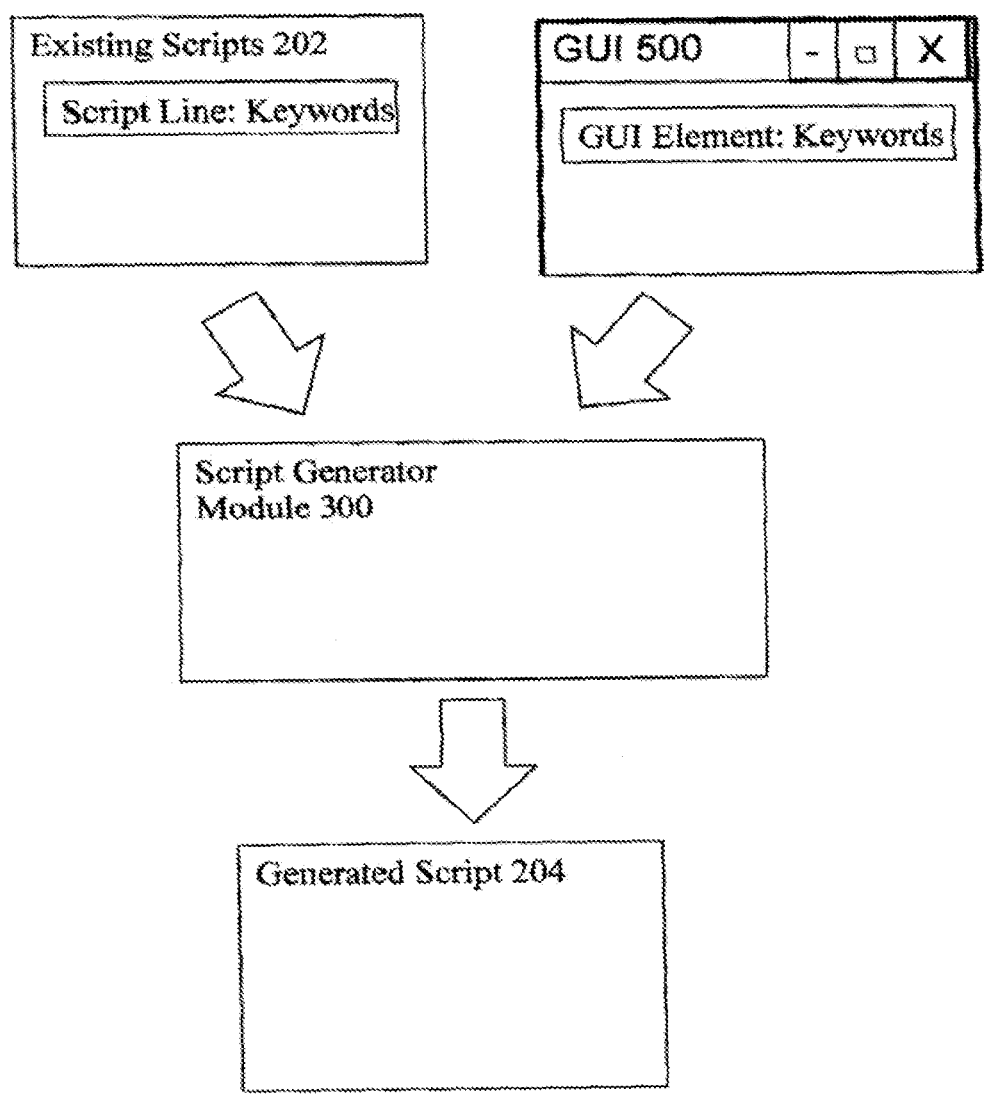
FIG. 2 is an interaction diagram showing the inputs and outputs, in accordance with a preferred embodiment of the claimed subject matter.

Referring to FIG. 2, during execution or the preferred embodiment, script generator module 300 (FIG. 1) receives existing scripts 202 and graphical user interface (GUI) 500 as input and generates output in the form of generated script 204.

Figure 3:
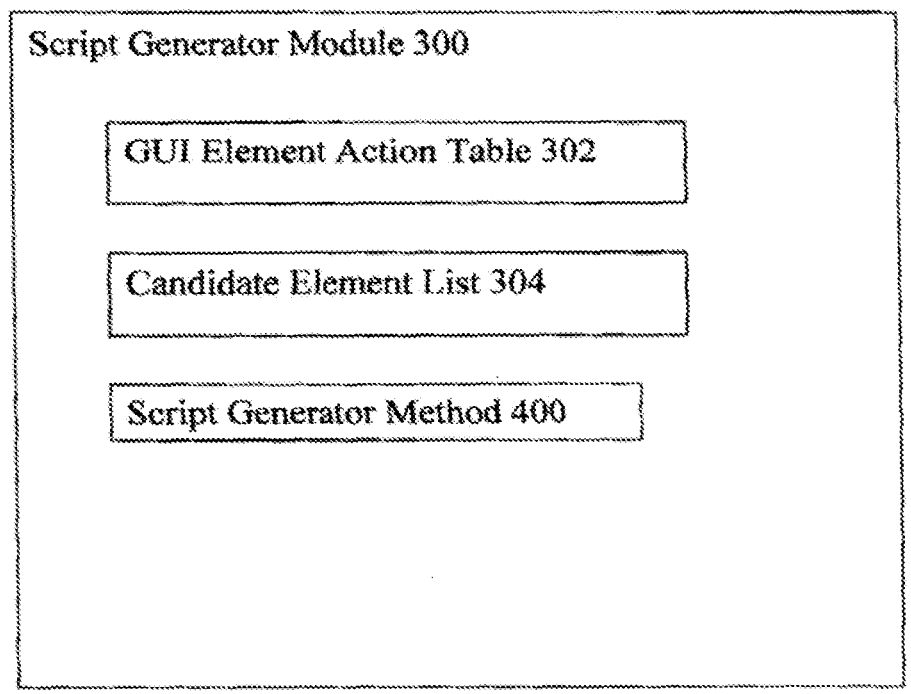
FIG. 3 is a component diagram, in accordance with a preferred embodiment of the claimed subject matter.

Referring to FIG. 3, script generator module 300 (FIGS. 1 and 2) comprises GUI element action table 302; candidate element list 304; and script generator method 400. GUI element action table 302 is a table of GUI elements and corresponding actions. Candidate element list 304 is a list of candidate elements. Script generator method 400 is the process that takes the above input and generates the script using GUI element action table 302 and candidate element list 304. It is described in more detail with respect to FIGS. 4A and 4B.

Figure 4A:
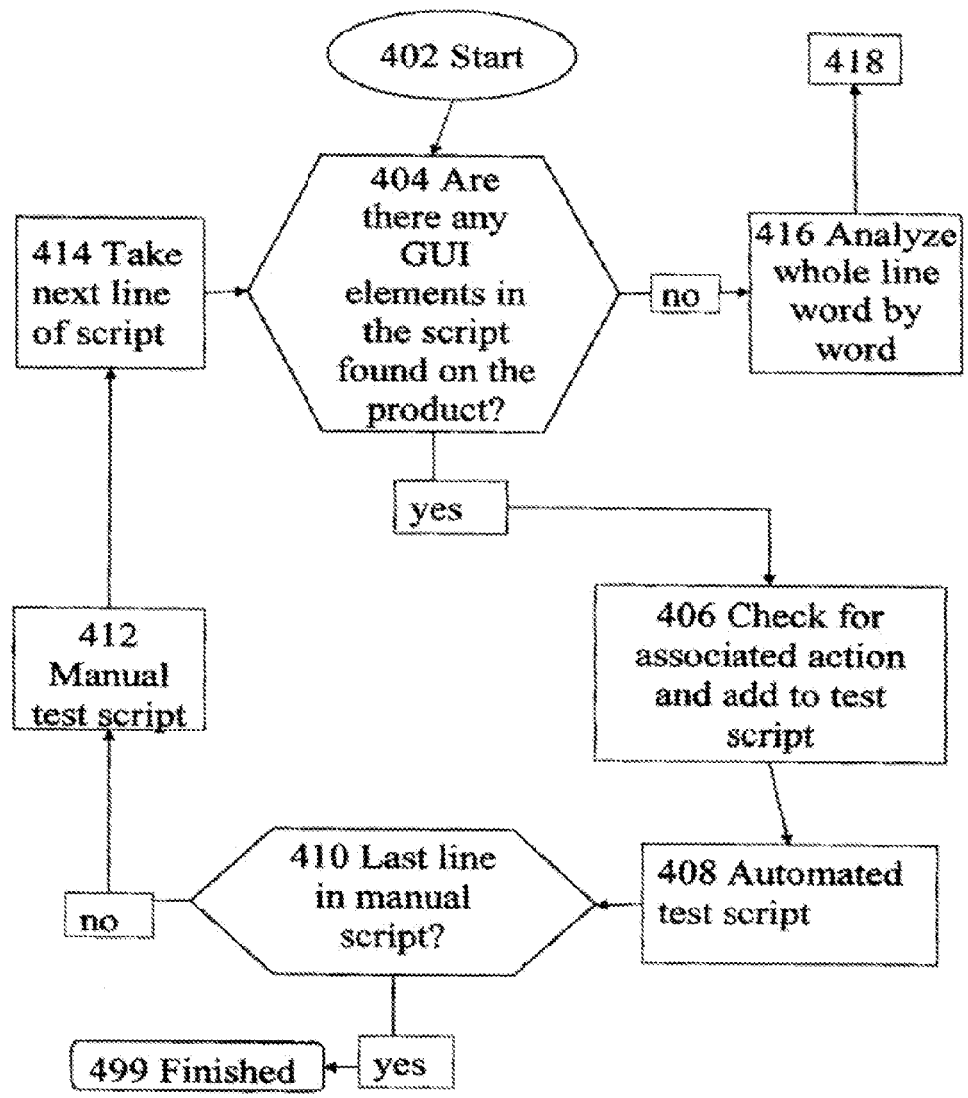
FIGS. 4A and 4B are flow diagrams of a process, in accordance with a preferred embodiment of the claimed subject matter.
Figure 4B:
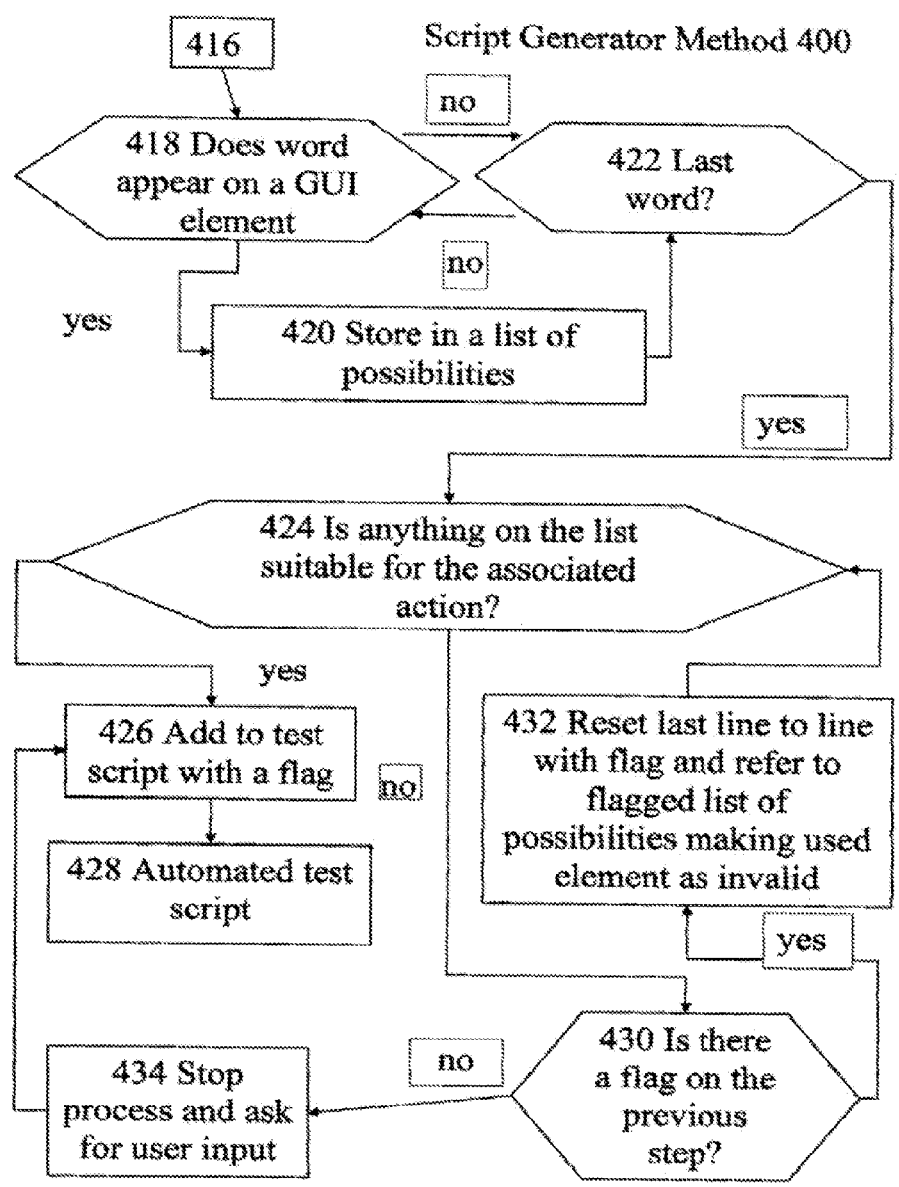

Referring to FIGS. 4A and 4B, script generator method 400 comprises logical process blocks 402, 404, 406, 408, 410, 412, 414, 416, 418, 420, 422, 424, 426, 428, 430, 432, 434 and 499.

Block 402 is the start of the method when a user first selects a manual test script (also known as the pre-existing script) for input and starting up the corresponding program that will be tested. When ready, the first step of the test script is parsed.

Block 404 is for determining if any GUI elements in the manual test script are found in the data model of the GUI and proceeding to block 406 if so. Else proceeding to block 416. In this embodiment, a manual text script is described but any pre-existing test script may be used.

Block 406 is for checking for associated action and requesting addition of the action to the test script (also known as the automated test script or generated script). If an element in the GUI matches keywords in the parsed line then the element is examined to see what actions could be taken. These actions are compared against the rest of the line to find the action that is tested.

Block 408 is for adding the action to the automated test script 204 and passing it on to block 410.

Block 410 is for checking if the last line in the manual script has been reached and proceeding to block 412 if not. If the last line of the manual test script is reached then block 499 and the end of the method.

Block 412 is for checking the manual test script for the next line.

Block 414 is for examining the next line of the manual test script and passing control back to block 404.

Block 416 is for analyzing the manual test script word by word and line by line. If no matching elements are found then each of the words in a parsed line are compared to the text found on the GUI. Vague instructions such as "Create new Java® Project" will often trigger block 416 as no GUI element is specified. Also, if the actions in the tested product for creating a code project that consists of clicking a "New" toolbar menu button and then selecting a "Code Project" option the term "Create new Code Project" will not appear as a whole on the GUI. This is where each word or the line is analyzed for possibilities. The word 'new' will be partnered with the "New" menu and stored in the table, the words 'code' and 'project' will most likely be matched to many elements on the GUI including the "Code Project" option. Since the "Code Project" option appears in the table twice and its parent element (the "New" menu) also appears in the table the element is chosen and the step is added to the new automated test script with a flag in case the next step is unachievable due to this decision. Java and all Java-based trademarks and logos are trademarks or registered trademarks of Oracle and/or its affiliates.

Block 418 is for checking if the word appears in a GUI element and proceeding to block 420 if so. If not then block 422.

Block 420 is for storing the word in candidate element list 304 as a possible word. Then block 422. If any of single word matches a word in a GUI element then that GUI element is added to the candidate element list 302.

Block 422 is for checking if the word is the last word in the line and proceeding to block 424 if so. If there are one or more words then the next word is selected and control is passed back to block 418. Once all of the words in the parsed line have been analyzed then the desired test script action is derived from the parsed line so that a suitable element can be selected from the list. The chosen element and action are added to the automated test script with a flag to highlight that the algorithm is less confident about the selected GUI element. GUI elements that have multiple words from the test script that match the name/labels or other fields, these will be weighted higher when making a determination of the GUI. As new GUI elements are added to the program's data model, these items will be given a higher priority when the algorithm checks for an inferred GUI element from the manual source line.

Block 424 is for checking if anything in candidate element list 304 is suitable for an associated action and proceeding to block 426 if so. If not then block 430.

Block 426 is for adding the suitable word and an associated flag to the test script.

Block 428 returns the test script and is the end of the method.

Block 430 is for checking if a flag existed on a previous block and processing to block 432. If no matching GUI elements are found (that is candidate element list 304 is empty) or none of the elements in the list are suitable partners for the desired action then the method will check previously added steps for any flags. If it finds a flag the method will backtrack via block 432 to the point at which the flagged step was inserted and attempt to find another matching element and partner from the stored list. If a suitable one is found then the method continues at block 424. If there are no previously flagged steps the method continues to block 434 where the conversion process is paused in order for a user to input the appropriate action the script needs to take. Additionally, when backtracking to a previously flagged element, the algorithm, if possible, will need to undo the steps it has already performed in the application, restarting the tool if this is not applicable.

Block 432 is for resetting the last line to line with the flag and refer to flagged list of possibilities making the used element invalid. Control is passed back to block 424.

Block 434 is for stopping the process and asking the user for input before proceeding back to block 426.

Block 499 is the end of the method.

Figure 5:
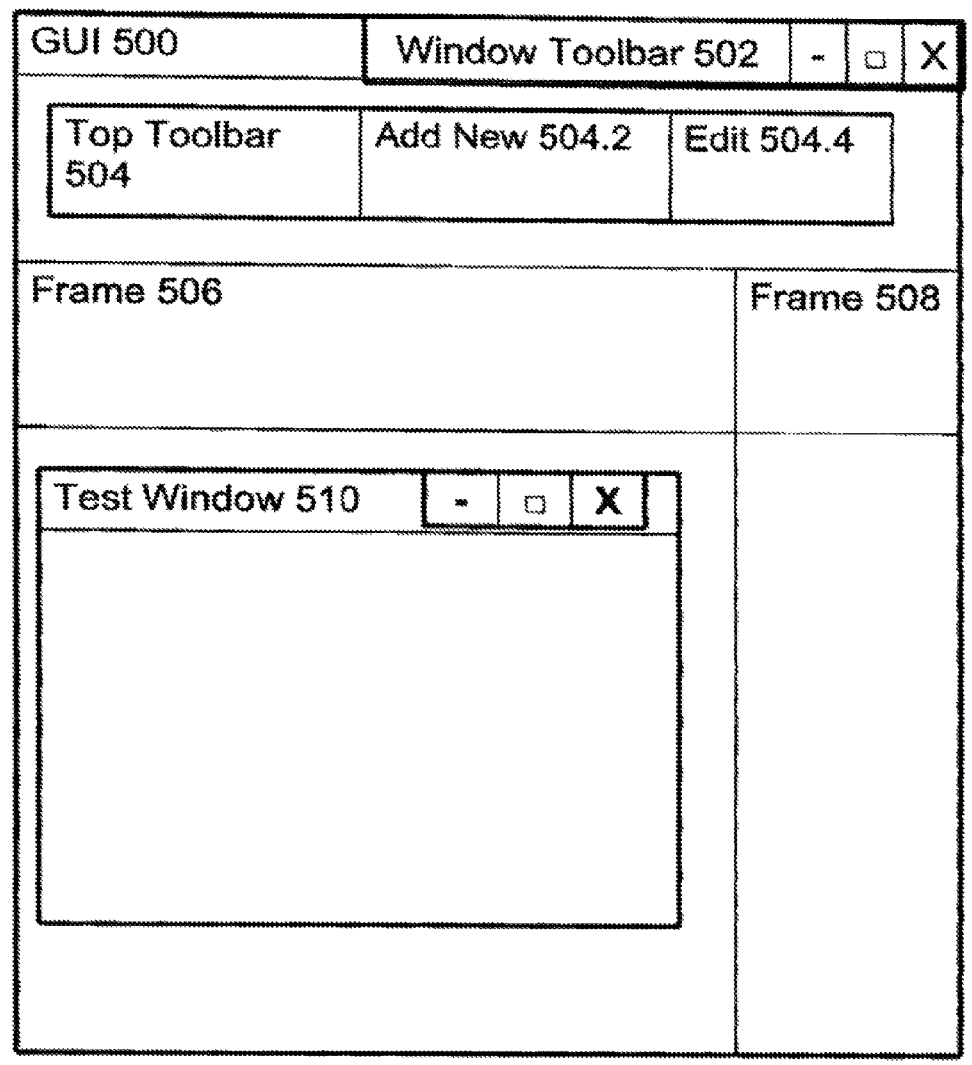
FIG. 5 is an example screen shot of a graphical user interface (GUI) 500, in accordance with a preferred embodiment of the claimed subject matter.

Referring to FIG. 5, an example is described with respect to GUI 500. GUI 500 comprises: window toolbar 502; top tool bar 504; first frame 506: second frame 508 and test window 510. Top tool bar 504 comprises buttons Add New Item 504.2 and Edit 504.4. Further, if "Add New Item" is clicked, at least one option offered is to add a new code protect, called 'Code Project' (not shown). A manual test script comprises test script lines: "Click the 'Add New Item' button". Script generator method 400 parses the manual test script and work out it was looking for a button. Once it has found the two button elements and determines that one of them has a name that matches text of the parse test script step it is analyzed for available actions. "Click" is an available action since the button is not disabled. The word "click" is in the parsed test step so it is safe to add "mouse click on that GUI element" to the automated test script and move onto the next text line of the manual test script.

A test script step such as: "Click on 'Delete Class'" in a GUI with no references to 'delete' or 'class' would leave the 'keyword <-> element' pair list empty.

A test script step such as: "Click on 'Edit Name'" in a GUI where the only element on the GUI that contains the words 'edit' or 'name' is a text box, would also leave the 'keyword <-> element' pair list empty or containing no items that match the click action respectively. After cycling, back to previous steps and finding no solution or not having any previous steps to go back to the user would be requested to perform the test step in question.

If a completely converted test script contains any flagged steps that the user has verified or user themselves have entered steps, then these 'keyword <-> element' pairs are added to a global set for future test script parsing. This means that the algorithm becomes more refined with increased confidence in selecting GUI elements. For example, looking at the example used above, the "Create new code project" requires a click on the 'Code Project' option in the 'Add New' menu. If this created a successful test script at the end this flagged step would be stored so that if "Create new code project" appeared again when processing another test script it would use this action rather than spend time working out the same solution.

Further embodiments of the claimed subject matter are now described. It will be clear to one of ordinary skill in the art that all or part of the logical process blocks of the described embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Figure 6:
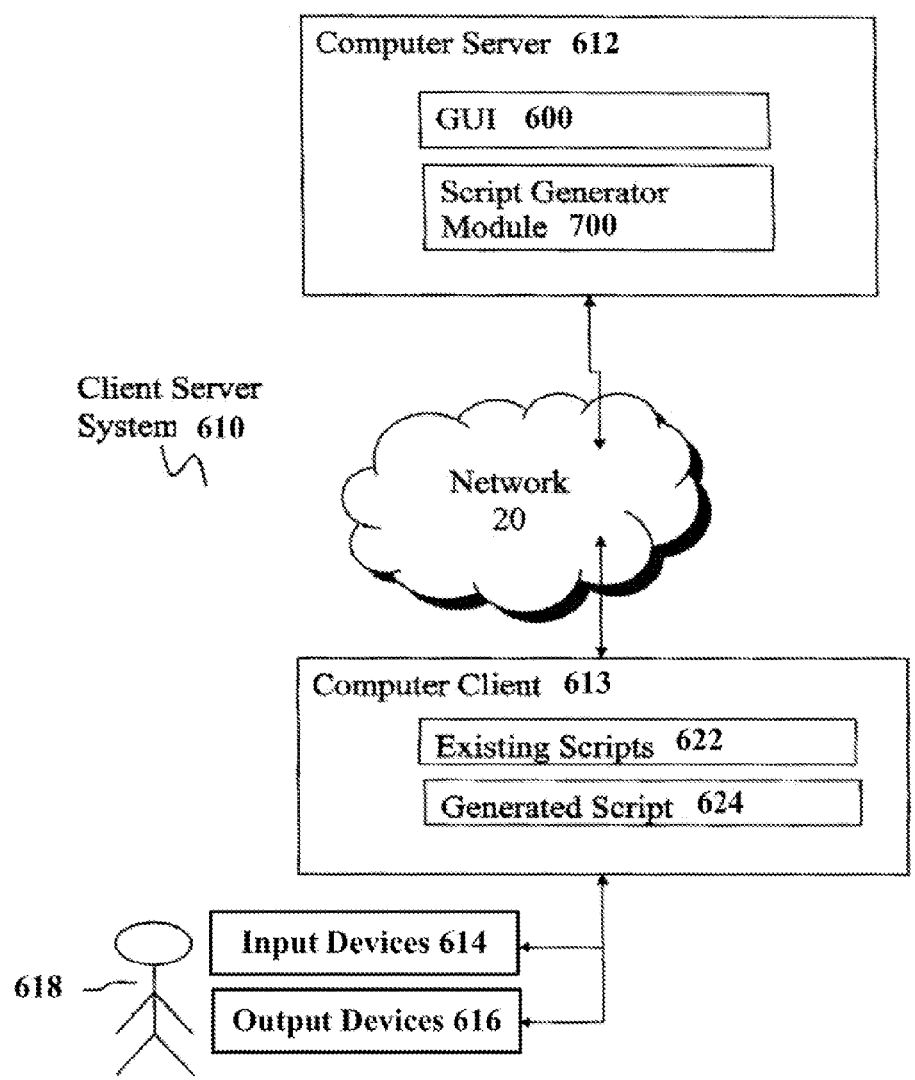
FIG. 6 is a deployment diagram of a client server embodiment, in accordance with the prior art, and in which a preferred embodiment of the claimed subject matter may be implemented.

Referring to FIG. 6, the claimed subject matter may be realized in the form of client server translation validation system 610 is an example client server embodiment comprising computer server 612 and computer client 613. Computer server 612 connects to computer client 613 via network 20. Computer client 613 provides output via output devices 616 to user 618 and received input from user 618 via input devices 614. In this client server embodiment existing scripts 622 are located on the client whereas GUI 600 and script generator module 700 are located in the computer server 612.

In this client server embodiment script translation is provided as a service to a client that has an existing script. Generated script 624 is produced in client 613 after successful completion of the translation.

It will be clear to one skilled in the art that many improvements and modifications can be made to the foregoing exemplary embodiment without departing from the scope of the claimed subject matter.

As will be appreciated by one skilled in the art, aspects of the claimed subject matter may be embodied as a system, method, computer program product or computer program. Accordingly, aspects of the claimed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the claimed subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples to non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the claimed subject matter may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the claimed subject matter are described below with reference to flowchart illustrations and/or block diagrams of methods, apparatus (systems) and computer program products according to embodiments of the claimed subject matter. It will be understood that each block of the flowchart illustrations and/or block diagrams, and combinations of blocks in the flowchart illustrations ardor block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the claimed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

We claim:

1. A method of generating a test script from a pre-existing script for testing a graphical user interface (GUI) comprising:
    parsing a pre-existing test script for a graphical user interface (GUI) to identify, using keywords and associated parameters, a first GUI action in a first line of the pre-existing test script;
    parsing a model associated with the GUI to identify GUI actions and associated elements for the GUI actions in the model;
    identifying a corresponding element for the first GUI action in a second line, following the first line, that are identified by keywords and associated parameters that exist in the pre-existing test script and match actions in the model;
    identifying GUI actions in the pre-existing test script that match GUI actions in the model; and
    generating a new test script by adding the first GUI action and corresponding element to the pre-existing test script.

2. The method of claim 1, wherein manual test scripts are further parsed using a natural language parser to highlight keywords and associated parameters.

3. The method of claim 1, wherein the pre-existing script is manually generated.

4. The method of claim 3 further comprising:
    further identifying GUI actions that contain keywords and parameters that exist in the pre-existing script;
    adding the further identified actions to a candidate list; and
    adding the further identified actions to the new test script if they are determined from the candidate list as possible actions.

5. The method of claim 4, wherein the further identified action is flagged in the new test script.

6. The method of claim 1, wherein the new test script is generated using an empty test script template.

7. The method of claim 1, wherein if no matching GUI elements are found or none of the elements in the list are suitable then the process is halted so that a user can input the appropriate action the script needs to take.

8. The method of claim 1, wherein after a generated test script is produced, any successful decisions from the candidate list or any input that the user was required to solve are added to a global set of 'keyword <->element' pairs for future test script parsing so that the process is refined over time.

\* \* \* \* \*